United States Patent
Gustavsson

(10) Patent No.: US 9,180,523 B2
(45) Date of Patent: Nov. 10, 2015

(54) PARTING AND GROOVING TOOL WITH CLAMPING ARRANGEMENTS

(71) Applicant: SECO TOOLS AB, Fagersta (SE)

(72) Inventor: Bjorn Gustavsson, Skinnskatteberg (SE)

(73) Assignee: SECO TOOLS AB, Fagersta (SE)

(*) Notice: Subject to any disclaimer, the term of this patent is extended or adjusted under 35 U.S.C. 154(b) by 0 days.

(21) Appl. No.: 14/371,799

(22) PCT Filed: Jan. 8, 2013

(86) PCT No.: PCT/EP2013/050231
§ 371 (c)(1),
(2) Date: Jul. 11, 2014

(87) PCT Pub. No.: WO2013/104630
PCT Pub. Date: Jul. 18, 2013

(65) Prior Publication Data
US 2014/0356084 A1    Dec. 4, 2014

(30) Foreign Application Priority Data

Jan. 13, 2012 (EP) ..................... 12151086

(51) Int. Cl.
*B23B 27/04* (2006.01)
*B23B 27/16* (2006.01)
*B23B 29/04* (2006.01)

(52) U.S. Cl.
CPC .......... *B23B 27/1659* (2013.01); *B23B 29/043* (2013.01); *B23B 2200/088* (2013.01); *B23B2200/165* (2013.01); *B23B 2205/02* (2013.01); *B23B 2205/04* (2013.01); *B23B 2270/06* (2013.01); *B23B 2270/08* (2013.01); *Y10T 407/22* (2015.01)

(58) Field of Classification Search
CPC ................ Y10T 407/2282; Y10T 407/2286; Y10T 407/2288; Y10T 407/25; Y10T 407/2272; B23B 27/04; B23B 27/1625; B23B 27/1666; B23B 27/1644; B23B 27/16
USPC .......................... 407/107, 109, 110, 117, 102
See application file for complete search history.

(56) References Cited

U.S. PATENT DOCUMENTS

| | | | |
|---|---|---|---|
| 4,580,930 A | 4/1986 | Zinner | |
| 5,207,537 A | 5/1993 | Englund | |
| 5,829,923 A | 11/1998 | Nowicki | |
| 8,696,259 B2 * | 4/2014 | Hecht | B23B 27/10 407/101 |
| 2009/0000454 A1 | 1/2009 | Baernthaler | |

FOREIGN PATENT DOCUMENTS

| | | | |
|---|---|---|---|
| CH | 685680 A5 | 9/1995 | |
| CH | 688794 A5 * | 3/1998 | |
| DE | 102005038828 A1 | 2/2007 | |
| FR | 2373349 A1 | 7/1978 | |
| SU | 140790 A2 | 6/1988 | |
| WO | 2010128706 A1 | 11/2010 | |

OTHER PUBLICATIONS

English Translation of CH 688794 A5, Mar. 1998.*

* cited by examiner

*Primary Examiner* — Sunil K Singh
*Assistant Examiner* — Alan Snyder
(74) *Attorney, Agent, or Firm* — Corinne R. Gorski

(57) ABSTRACT

A parting and grooving tool includes a toolholder and a cutting insert. The toolholder has a toolholder body including a main body portion and an elastic clamping arm that define an insert-receiving pocket. The pocket has a top surface formed by the clamping arm and a bottom surface formed by the main body portion for contacting a top and a bottom surface of a cutting insert. The toolholder body includes a second arm, the second arm and the clamping arm defining a slot. A threaded hole extends through the second arm to the slot. The toolholder has a screw having threads that mate with threads in the threaded hole so that the clamping arm is movable into and out of contact with the top surface of the insert. An axis of the threaded hole is substantially perpendicular to a longitudinal axis of the insert-receiving pocket and intersects the cutting insert.

20 Claims, 3 Drawing Sheets

US 9,180,523 B2

PARTING AND GROOVING TOOL WITH CLAMPING ARRANGEMENTS

RELATED APPLICATION DATA

This application is a §371 National Stage Application of PCT International Application No. PCT/EP2013/050231 filed Jan. 8, 2013 claiming priority of EP Application No. 12151086.1, filed Jan. 13, 2012.

BACKGROUND AND SUMMARY

The present invention relates to parting and grooving tool with clamping arrangements.

Certain machining operations, such as cut-off and grooving operations, typically involve the use of a thin toolholder having a pocket formed therein in which an insert is received. Ordinarily, the insert is held in the pocket between an elastic arm of the toolholder and the rest of the toolholder body. The insert is received in the pocket by some form of tool that pries the elastic arm to open the pocket wider, and then the insert is clamped in the pocket when the tool is removed. The tools for opening the insert-receiving pockets tend to be complex and difficult to position, making the task of indexing or replacing inserts in a toolholder difficult. An example of a conventional tool is shown in U.S. Pat. No. 5,207,537, or U.S. Pat. No. 4,580,930; the preamble of claim 1 being based the latter.

It is desirable to provide a toolholder that provides a simple structure to facilitate and improve clamping of inserts in a pocket of the toolholder.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
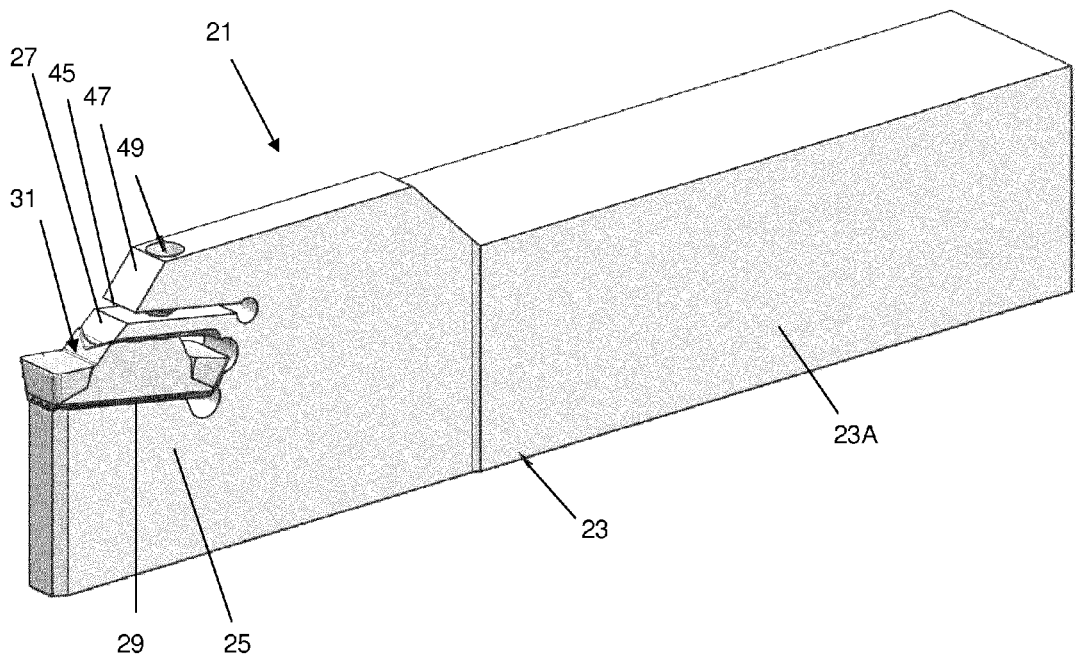
FIG. 1 is a schematic view of a parting and grooving tool according to an aspect of the present invention.
Figure 4:
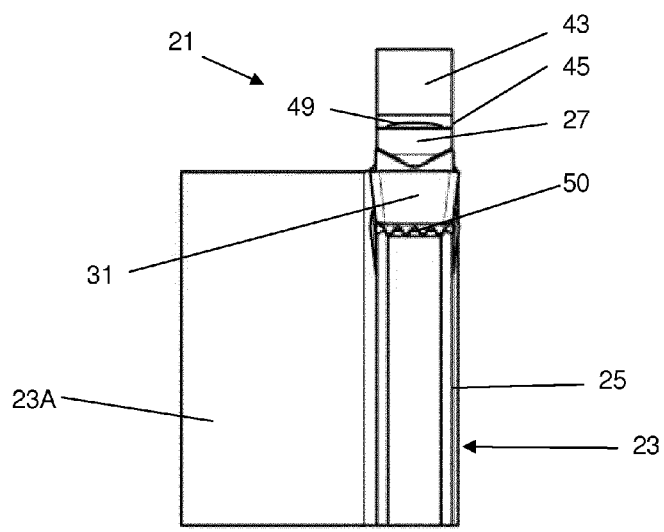
FIG. 4 is a front view of the parting and grooving tool.

FIGS. 1-4 show a toolholder 21 comprising a toolholder body 23 having a shank 23A and comprising a main body 25 portion and an elastic clamping arm 27. The main body portion 25 and the clamping arm 27 define an insert-receiving pocket 29 for receiving a cutting insert 31. The pocket 29 has a top surface 33 formed by the clamping arm 27 and a bottom surface 35 formed by the main body portion 25 for contacting a top and a bottom surface 37 and 39 of the cutting insert 31.

The toolholder body 23 further comprises a second arm 43. The second arm 43 and the clamping arm 27 define a slot 45. A threaded hole 47 extends through the second arm 43 to the slot 45. The toolholder 21 further comprises a screw 49 having threads that mate with threads in the threaded hole 47 so that an end of the screw is movable into an out of contact with the clamping arm 27 and/or the clamping arm 27 may be movable into and out of contact with the top surface 37 of the insert while the end of the screw 49 is constantly in contact with the clamping arm 27.

Usually the screw 49 contacts the clamping arm 27, while the insert 31 is inserted into the pocket 29. Usually, the clamping arm 27 has a limited elasticity, or is at least more easily bent than the thicker main body portion 25 and the second arm 43. When the insert 31 is disposed in the pocket 29, a force tending to retain the insert in the pocket 27 is exerted on the insert by the clamping arm 27 via the main body portion 25.

In the toolholder 21 shown in FIG. 1, by advancing the screw 49 in the hole 47, it is possible to increase the force with which the clamping arm 27 and main body portion 25 are able to clamp the insert 31. When the screw 49 contacts the clamping arm 27, further movement in the hole 47 toward the clamping arm is resisted by the clamping arm and the screw can only be advanced further in the hole by stressing the second arm and the clamping arm so that the second arm moves away from the clamping arm, the clamping arm moves away from the second arm, or both. In this way, the insert 31 is clamped in the pocket 29 by whatever force would ordinarily be applied by the clamping arm 27 and the main body portion 25 alone plus at least some portion of a force applied to the clamping arm by the second arm 43 through the screw 49. The clamping arm 27 can be thinner (and thus more easily bent) than the second arm 43 so that the clamping arm 27 can be easily opened to receive and remove inserts 31, and so that the second arm 43 will not tend to bend as the screw 49 is advanced in the hole 47. The pocket 29 can be sized so that, when the screw 49 does not apply any force to the clamping arm 27, the insert 31 is freely movable in and out of the pocket because the clamping arm applies no or minimal force to clamp the insert by itself.

The top and bottom surfaces 33 and 35 of the pocket 29 can comprise one or more grooves or ridges 50 for mating with corresponding ridges or grooves in the top and bottom surfaces 37 and 39 of the insert 21. The grooves/ridges can facilitate preventing the insert 31 from being moved laterally out of the pocket 29 as disclosed in U.S. Pat. No. 6,244,790 which is hereby incorporated by reference.

Figure 2:
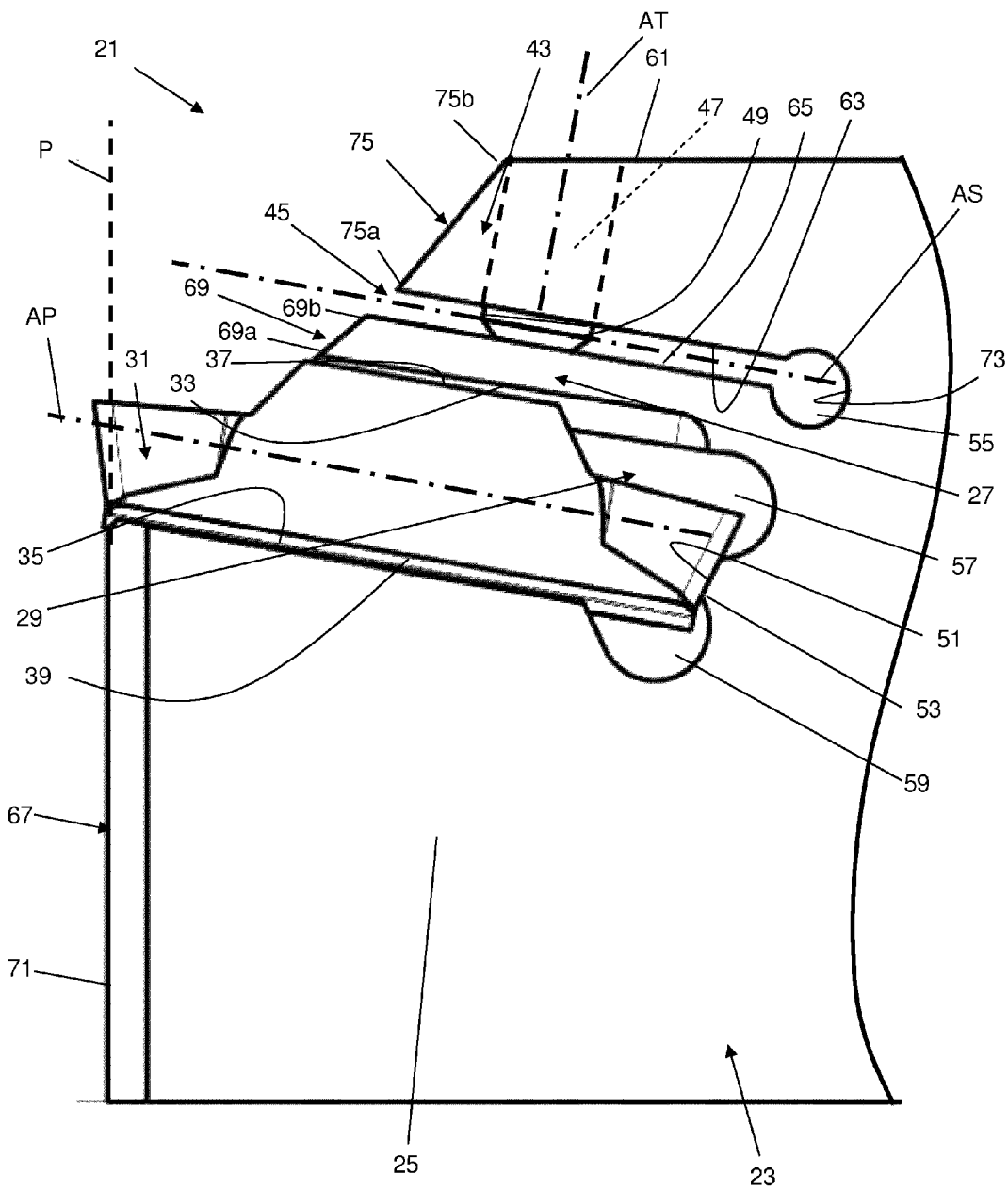
FIG. 2 is a side view of a portion of the parting and grooving tool.
Figure 3:
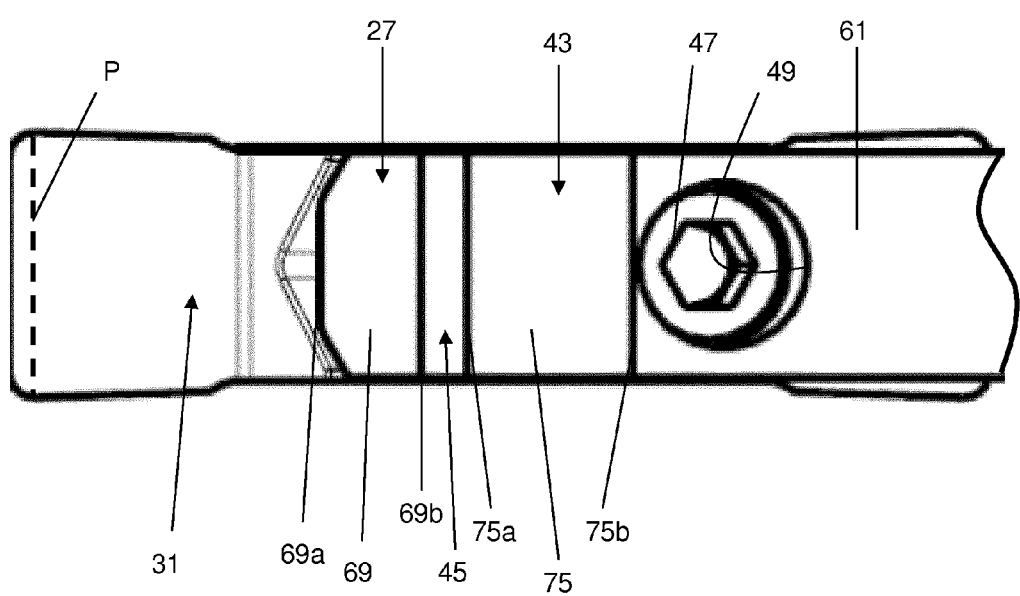
FIG. 3 is a top view of a portion of the parting and grooving tool.

The pocket 29 ordinarily comprises an abutment surface for abutting a surface of the insert so that the insert is stopped from extending further into the pocket. As seen, for example, in FIG. 2, the abutment surface 51 can define at least part of a rear surface of the pocket 29, where the rear surface extends between the top surface 33 and the bottom surface 35 of the pocket, and the abutment surface can abut a supporting surface 53 on the insert 31. Providing the abutment surface 51 at the rear surface of the pocket 29 facilitates providing the insert supporting surface 53 on a clearance surface of an indexable insert 31 as seen in FIG. 2. It is, however, possible to have other surfaces of the pocket and insert form abutment and supporting surfaces than those shown in FIG. 2. For example, an abutment surface may be provided on a projection descending downwardly from the top surface 33 of the pocket 29 and can contact a surface on a projection projecting upwardly from the top surface of the insert 31.

A stress relieving opening 55 can extend through the toolholder body 25 at an inner end of the slot 45. Ordinarily, the stress relieving opening 55 is a circular hole. Stress relieving openings 57 and 59 can be formed on the top and bottom of the abutment surface 51 in the pocket 29, as well.

Ordinarily, the threaded hole 47 extends from a top surface 61 of the second arm 43 to a bottom surface 63 of the second arm, the bottom surface of the second arm defining a top surface of the slot 45. If desired, the threaded hole 47 can extend through a side of the second arm 43. Ordinarily, an axis AT of the threaded hole 47 is perpendicular a longitudinal axis AS of the slot 45.

The top surface 33 of the pocket 29 is ordinarily shorter than the bottom surface 35 of the pocket. In this way, an upper surface of the insert 31 will ordinarily be exposed. The exposed surface of the insert 31 can form a rake surface and may have chip breaking structures. The slot 45 has a top surface formed by the bottom surface 63 of the second arm 43 and a bottom surface formed by a top surface 65 of the clamping arm 27. The top surface of the slot 43 can be shorter than the bottom surface of the slot.

The pocket 29 extends into the toolholder body 23 from a front end 67 of the toolholder body and includes a rear surface (in the illustrate toolholder, the rear surface is the abutment surface 51). The front end 67 of the toolholder body 23 is at least partially defined by a front end 69 of the clamping arm 27 and a front end 71 of the main body portion 25. The front end 69 of the clamping arm 27 is closer to the rear surface 51 of the pocket 29 than the front end 67 of the main body portion 25. The front end 69 of the clamping arm 27 can be angled so that an edge 69a of the front end of the clamping arm closest to the pocket 29 is further (in terms of a horizontal distance as seen in FIG. 2) from the rear surface 51 of the pocket than an edge 69b of the front end of the clamping arm furthest from the pocket. In this manner, the angled front end 69 of the clamping arm 27 can facilitate removal of chips formed on the exposed rake surface of the insert 31 and positioning of the toolholder 21 relative to a workpiece.

The slot 45 extends into the toolholder body 23 from the front end 67 of the toolholder body and includes a rear surface 73. The front end 67 of the toolholder body 23 is at least partially defined by the front end 69 of the clamping arm 27 and a front end 75 of the second arm 43. The front end 75 of the second arm 43 is closer to the rear surface 73 of the slot 45 than the front end 69 of the clamping arm 27. The front end 75 of the second arm 43 can be angled so that an edge 75a of the front end of the second arm closest to the slot 45 is further (in terms of a horizontal distance as seen in FIG. 2) from the rear surface 73 of the slot than an edge 75b of the front end of the second arm furthest from the slot. In this manner, the angled front end 75 of the second arm 43 can facilitate removal of chips formed on the exposed rake surface of the insert 31 and positioning of the toolholder 21 relative to a workpiece.

Ordinarily, the pocket 29 and the slot 45 extend into the toolholder body 23 from the front end 67 of the toolholder body 23, and the front end of the toolholder body is at least partially defined by the front end 71 of the main body portion 25, the front end 69 of the clamping arm 27, and the front end 75 of the second arm 43. The front end 69 and/or 75 of at least one of the clamping arm 27 and the second arm 43 can form a non-zero angle with the front end 71 of the main body portion 25. Forming one or, ordinarily, both of the front end 69 of the clamping arm 27 and the front end 75 of the second arm 43 at a non-zero angle with the front end 71 of the main body portion 25 can facilitate removal of chips formed by the exposed rake surface of the insert 31 and positioning of the toolholder 21 relative to a workpiece.

Ordinarily, the pocket 29 and the slot 45 extend into the toolholder body 23 from the front end 67 of the toolholder body 23. The pocket 29 and the slot 45 include a pocket rear surface 51 and a slot rear surface 73, respectively. The front end 67 of the toolholder body 23 is at least partially defined by the front end 71 of the main body portion 25, the front end 69 of the clamping arm 27, and the front end 75 of the second arm 43. The pocket rear surface 51 is ordinarily disposed closer to a plane P of the front end 71 of the main body portion 25 than the slot rear surface 73. Ordinarily, the longitudinal axis AS of the slot 45, or at least the top and bottom surfaces of the slot, is non-perpendicular to the plane P of the front end 71 of the main body portion 25. Similarly, ordinarily, the longitudinal axis AP of the pocket 29, or at least the top and bottom surfaces 33 and 35 of the slot, is non-perpendicular to the plane P of the front end 71 of the main body portion. Ordinarily, the longitudinal axis AS of the slot 45 is perpendicular to the bottom surface 35. Providing the longitudinal axes of the pocket 29 and slot 45 at angles other than perpendicular to the plane P of the front end 71 of the main body portion 25 can facilitate optimizing the orientation of the insert 31 relative to the toolholder 21 and relative to the workpiece. The axis AT of the threaded hole 47 is substantially perpendicular to the longitudinal axis AP of the pocket 29. The axis AT of the threaded hole 47 intersects the cutting insert 31.

Thus, the present invention relates to a parting and grooving tool wherein the sole loose part is the screw 49, all clamping means are enclosed by the work piece when deep grooves are machined which makes the arrangement suitable for adaptation to different shank options.

The problem of providing a simple structure is solved by arranging the threaded hole substantially perpendicular to the axis of the insert-receiving pocket. Thereby, the clamp screw can be placed close to the insert in toolholders without affecting the width of the tool. Furthermore, by making the axis of the threaded hole intersecting the cutting insert favorable force conditions arise.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 12151086.1, from which this application claims priority, are incorporated herein by reference.

What is claimed is:
1. A parting and grooving tool comprising:
a toolholder and a cutting insert, the toolholder including a toolholder body having a main body portion and an elastic clamping arm, the main body portion and the clamping arm defining an insert-receiving pocket, the pocket having a top surface formed by the clamping arm and a bottom surface formed by the main body portion for contacting a top and a bottom surface of the cutting insert, respectively,
wherein the toolholder body includes a second arm, the second arm and the clamping arm defining a slot, a threaded hole extends through the second arm to the slot, the toolholder including a screw having threads that mate with threads in the threaded hole so that the clamping arm is movable into and out of contact with the top surface of the insert,
wherein an axis of the threaded hole is substantially perpendicular to a longitudinal axis of the insert-receiving pocket and wherein the axis of the threaded hole intersects the cutting insert, and
wherein the threaded hole extends from a top surface of the second arm to a bottom surface of the second arm, the bottom surface of the second arm defining a top surface of the slot.

2. The tool as set forth in claim 1, wherein an abutment surface defines at least part of a rear surface of the pocket, the rear surface extending between the top surface and the bottom surface of the pocket.

3. The tool as set forth in claim 1, further comprising a stress relieving opening extending through the toolholder body at an inner end of the slot.

4. The tool as set forth in claim 1, wherein the top surface of the pocket is shorter than the bottom surface of the pocket.

5. The tool as set forth in claim 1, wherein the slot has a top surface formed by the second arm and a bottom surface formed by the clamping arm, the top surface being shorter than the bottom surface.

6. The tool as set forth in claim 1, wherein the pocket extends into the toolholder body from a front end of the toolholder body and includes a rear surface, the front end of the toolholder body being at least partially defined by a front end of the clamping arm and a front end of the main body portion, the front end of the clamping arm being closer to the rear surface of the pocket than the front end of the main body portion.

7. The tool as set forth in claim 1, wherein the pocket extends into the toolholder body from a front end of the toolholder body and includes a rear surface, the front end of the toolholder body being at least partially defined by a front end of the clamping arm, the front end of the clamping arm being angled so that an edge of the front end of the clamping arm closest to the pocket is further from the rear surface of the pocket than an edge of the front end of the clamping arm furthest from the pocket.

8. The tool as set forth in claim 1, wherein the slot extends into the toolholder body from a front end of the toolholder body and includes a rear surface, the front end of the toolholder body being at least partially defined by a front end of the clamping arm and a front end of the second arm, the front end of the second arm being closer to the rear surface of the slot than the front end of the clamping arm.

9. The tool as set forth in claim 1, wherein the pocket and the slot extend into the toolholder body from a front end of the toolholder body, the front end of the toolholder body being at least partially defined by a front end of the main body portion, a front end of the clamping arm, and a front end of the second arm the front end of at least one of the clamping arm and the second arm forming a non-zero angle with the front end of the main body portion.

10. The tool as set forth in claim 1, wherein the pocket and the slot extend into the toolholder body from a front end of the toolholder body, the pocket and the slot including a pocket rear surface and a slot rear surface, respectively, the front end of the toolholder body being at least partially defined by a front end of the main body portion, a front end of the clamping arm, and a front end of the second arm, the pocket rear surface being disposed closer to a plane of the front end of the main body portion than the slot rear surface.

11. The tool as set forth in claim 1, wherein the slot extends into the toolholder body from a front end of the toolholder body, the front end of the toolholder body being at least partially defined by a front end of the main body portion, a front end of the clamping arm, and a front end of the second arm, and the slot is non-perpendicular a plane of the front end of the main body portion.

12. The tool as set forth in claim 1, wherein at least one of the top and bottom surface of the pocket includes one or more grooves or ridges.

13. The tool as set forth in claim 1, wherein the slot includes a first stress relieving opening and the insert-receiving pocket includes a second stress relieving opening, and the first stress relieving opening is closer to a shank of the toolholder body than the second stress relieving opening.

14. A parting and grooving tool comprising:
a toolholder,
wherein the toolholder includes a unitary toolholder main body portion having a shank at a first end and a clamping arrangement at a second end,
wherein the clamping arrangement includes an elastic clamping arm interposed between a second arm and an insert-receiving pocket,
wherein the insert-receiving pocket has a top surface formed by a portion of the clamping arm and a bottom surface formed by a portion of the main body portion for contacting a top and a bottom surface of the cutting insert, respectively,
wherein the second arm is separated from the clamping arm by a slot, and a threaded hole extends from a top surface of the unitary toolholder main body portion through the second arm to the slot,
wherein the threaded hole receives a screw to move the clamping arm into and out of contact with a top surface of an insert seated in the insert-receiving pocket,
wherein an axis of the threaded hole is substantially perpendicular to a longitudinal axis of the insert-receiving pocket, and
wherein the axis of the threaded hole intersects the insert-receiving pocket.

15. The tool as set forth in claim 14, wherein the clamping arm is thinner than the second arm.

16. The tool as set forth in claim 14, wherein the slot includes a first stress relieving opening and the insert-receiving pocket includes a second stress relieving opening, and the first stress relieving opening being closer to the shank of the toolholder main body than the second stress relieving opening.

17. The tool as set forth in claim 16, wherein the longitudinal axes of the insert-receiving pocket and a longitudinal axes of the slot are at a non-perpendicular angle to a plane of the second end of the main body portion.

18. The tool as set forth in claim 14, wherein the longitudinal axes of the insert-receiving pocket and a longitudinal axes of the slot are at a non-perpendicular angle to the a plane of the second end of the main body portion.

19. A parting and grooving tool comprising:
a toolholder,
wherein the toolholder includes a unitary toolholder main body portion having a shank at a first end and a clamping arrangement at a second end,
wherein the clamping arrangement includes an elastic clamping arm interposed between a second arm and an insert-receiving pocket,
wherein the insert-receiving pocket has a top surface formed by a portion of the clamping arm and a bottom surface formed by a portion of the main body portion for contacting a top and a bottom surface of the cutting insert, respectively,
wherein the second arm is separated from the clamping arm by a slot, and a threaded hole extends through the second arm to the slot,
wherein the threaded hole receives a screw to move the clamping arm into and out of contact with a top surface of an insert seated in the insert-receiving pocket,
wherein an axis of the threaded hole is substantially perpendicular to a longitudinal axis of the insert-receiving pocket,
wherein the axis of the threaded hole intersects the insert-receiving pocket, and wherein the slot includes a first stress relieving opening and the insert-receiving pocket includes a second stress relieving opening, and the first stress relieving opening being closer to the shank of the toolholder main body than the second stress relieving opening.

20. The tool as set forth in claim 19, wherein the slot extends into the toolholder main body from a front end, the front end being at least partially defined by a front end of the clamping arm, a front end of the second arm, and a portion of the toolholder main body portion that contains a bottom surface of the insert-receiving pocket, and wherein the slot is non-perpendicular a plane of the front end of the main body portion.

* * * * *